United States Patent [19]

Lottiau et al.

[11] Patent Number: 4,927,583
[45] Date of Patent: May 22, 1990

[54] PROCESS FOR THE MANUFACTURE OF POLYAMIDE COMPOSITE MATERIAL REINFORCED WITH LONG FIBERS

[75] Inventors: Michel Lottiau, Bernay; Michel Glemet, Serquigny; Gilles Cognet; Alain Causier, both of Bernay, all of France

[73] Assignee: Atochem, France

[21] Appl. No.: 95,047

[22] Filed: Sep. 9, 1987

[30] Foreign Application Priority Data

Sep. 17, 1986 [FR] France ................. 86 12997

[51] Int. Cl.$^5$ .............. B32B 31/16; B32B 31/26
[52] U.S. Cl. ..................... 264/136; 264/236; 264/257; 264/331.19; 156/180; 425/114
[58] Field of Search .......... 156/180, 441, 166; 264/136, 134, 137, 236, 347, 257, 331.19; 427/331, 355, 358, 389.9; 425/114

[56] References Cited

U.S. PATENT DOCUMENTS

| | | | |
|---|---|---|---|
| 2,518,454 | 8/1950 | Elliot | 264/DIG. 61 |
| 2,669,754 | 2/1954 | Chadbourne | 264/DIG. 61 |
| 2,935,372 | 5/1960 | Steuber | 264/83 |
| 3,333,034 | 7/1967 | Muller | 264/83 |
| 3,658,624 | 4/1972 | Lees | 156/332 |
| 3,660,528 | 5/1972 | Elisbarovna | 156/332 |
| 3,681,488 | 8/1972 | Jamison | 264/83 |
| 3,697,353 | 10/1972 | Brochu | 156/332 |
| 3,744,947 | 7/1973 | Skobel | 264/114 |
| 3,966,864 | 6/1976 | Stenzenberger | 264/136 |
| 4,051,214 | 9/1977 | Casper | 264/136 |
| 4,164,535 | 8/1979 | Veaute | 264/136 |
| 4,251,581 | 2/1981 | Schoppa | 264/136 |
| 4,305,900 | 12/1981 | Cavalli | 425/114 |
| 4,342,718 | 8/1982 | Caratsch | 264/136 |
| 4,469,541 | 9/1984 | Goldsworthy | 156/180 |
| 4,479,837 | 10/1984 | Senatore | 156/180 |
| 4,559,262 | 12/1985 | Cogswell | 156/166 |
| 4,588,538 | 5/1986 | Chung | 264/174 |
| 4,614,678 | 9/1986 | Ganga | 264/136 |
| 4,681,722 | 7/1987 | Carter | 156/180 |

FOREIGN PATENT DOCUMENTS 751291  1/1967  Canada .................. 264/DIG. 56

OTHER PUBLICATIONS

Plastics World, Technology Watch by Bernie Miller, Dec. 1986, p. 61.

Primary Examiner—Jay H. Woo
Assistant Examiner—Jeremiah F. Durkin, II
Attorney, Agent, or Firm—Sigalos, Levine & Montgomery

[57] ABSTRACT

In the process for the manufacture of a polyamide composite material reinforced with long fibers, the improvement comprising impregnating the fibers with a polyamide oligomer or prepolymer, heat-treating the impregnated fiber to increase the length of the polymer chain, and then shaping the impregnated fiber by pultrusion.

9 Claims, No Drawings

PROCESS FOR THE MANUFACTURE OF POLYAMIDE COMPOSITE MATERIAL REINFORCED WITH LONG FIBERS

BACKGROUND OF THE INVENTION

The present invention pertains to a process for the manufacture of a composite material made of polyamide reinforced with long fibers. The process involves the coating of the long fibers with a polyamide prepolymer or oligomer and subsequent heating of the product obtained to achieve polymerization before pultrusion.

The extrusion of a thermoplastic resin, such as a polyamide, in the presence of fibers to improve their mechanical properties is known. Nevertheless, this method is prone to the generation of a material which contains a very high proportion of short fibers, and consequently, does not have the best mechanical properties, particularly excellent flexing characteristics.

The best mechanical properties of plastic resins reinforced with fibers are obtained with resins reinforced with long fibers. To obtain these long-fiber composites, one usually uses the pultrusion technique which involves drawing through a heated die of very long fibers which were first impregnated with a plastic resin. According to this technique, one manufactures rectilinear or curved composite profiles which are highly reinforced in the main direction and whose mechanical characteristics according to this direction can come close to those of some metals, assuming a coherent selection.

A vital and difficult feature of this technique is the impregnation of the fibers. The difficulties would not be so great when the fibers impregnated are thermally hardening resins such as epoxides or polyesters, which at ambient temperature are frequently found in the form of liquids or in solution. The impregnation of the fibers with a thermoplastic resin that is solid at ambient temperature and has a relatively high melting point is more difficult.

The various techniques contemplated so far have been shown to be inefficient or difficult to apply. Such is the case, for example, involving the impregnation of fibers with a thermoplastic polymer powder in a fluidized bed. Another similar case is the passing of the fibers through a thermoplastic polymer solution; the primary shortcoming of this technique is the elimination of great amounts of solvent.

Under these conditions, it is difficult to efficiently reinforce the polyamides with long fibers. These thermoplastic polymers must be kept at high temperatures to be fluid enough to achieve satisfactory impregnation of the fibers, or highly diluted in a solvent, which would involve the problem of eliminating the solvent.

SUMMARY OF THE INVENTION

The technique according to the invention remedies these shortcomings. It involves the impregnation of the fibers with a polyamide prepolymer or oligomer, which at each end of the molecular chain has a reactive functional group that can react from one molecule of oligomer or prepolymer to another, and then subsequent heating results in the lengthening of the polymer chain before the shaping of the entire mass of material by pultrusion. The reactive functional groups at the ends of the chain usually correspond to one amine functional group and one carboxylic acid functional group per molecule.

DETAILED DESCRIPTION

These low-molecular-weight oligomers of prepolymers present the advantage that they are fluid at their melting temperature. These polyamide-sequence compounds are usually obtained from caprolactams, hexamethylenediamine and adipic acid, hexamethylenediamine and sebacis acid, dodecalactam and undecanoic acid. They also could be polyamides-imides. Examples of such products are the oligomers or prepolymers of polyamides 6, 6.6, 6.10, 6.12, 11 and 12.

The oligomers or prepolymers that are particularly recommended in the invention correspond to the general formula:

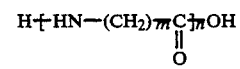

in which:
m is a number from 5 to 11; and
n is a number from 10 to 40.

The fibers, preferably in the form of long fibers, that is, continuous fibers or rovings generally made of glass, carbon or aramides such as KEVLAR fibers, are impregnated by circulation in the prepolymer or oligomer, preferably in a powder or molten form. If the impregnation is carried out in a powder, this latter is preferably in fluidized form. The fluidization is carried out according to the known powder fluidization methods.

The impregnated fibers are heat treated, preferably at a temperature ranging from 190° C. to 350° C., so as to complete the impregnation of the fibers and to increase the length of the polyamide chains. The preferred oligomers or prepolymers according to the preceding formula are being transformed into polymers when the value of n ranges between 50 and 80.

Upon completion of the polymerization heat treatment, the polymer impregnated fibers are drawn through a die kept at a temperature such that the material acquires a temperature of from about 190° C. to 300° C. To preserve a good final structure of the profiled product obtained, it is recommended to cool the drawn material in a second die kept at ambient temperature.

Depending on the temperature conditions and the ratio of the weight of the fiber; such as glass, to the weight of the resin, the impregnated fibers are usually drawn through a conventional pultrusion setup at a rate ranging from 0.3 to meters per minute.

The invention will be further described in connection with the following examples which are set forth for purposes of illustration only.

EXAMPLE 1

A cube-shaped tank with 500 mm sides, provided with a porous bottom is loaded with 25 kg of a prepolymer powder with the formula:

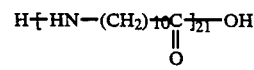

This powder has a granulometric distribution ranging from 80 to 200 microns. The powder is fluidized by applying a high pressure of 2 bars of compressed air at the bottom of the tank.

Eighteen rovings of glass fibers, R 099 P 103 VETROTEX (2400 Tex), are passed through the fluidized bed at a rate of 0.5 m/minute. The impregnated fibers are preheated under an infrared panel before being drawn through a 100×200 mm die maintained at 270° C. Upon leaving the heated die, the material crosses a 50×50 mm shaping die maintained at 240° C. and located at a distance of ca. 500 mm from the first die. The final shape of the profile is achieved by passing the material through a last 50×100 mm shaping die which operates at ambient temperature.

4×10 mm bars are prepared on the material obtained. The bars are subjected to three point flexing tests according to standard ISO R-178.

The following results are obtained from test specimens containing 65% by weight of glass:

YOUNG E modulus=26 GPa

Breaking force=450 MPa

In comparison, the prepolymer is replaced by a polymer having the formula:

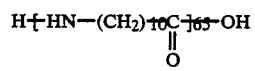

In this case, the YOUNG E modulus is 22 GPa, and the breaking force is 425 MPa.

EXAMPLE 2

One operates under the conditions of Example 1, but with a prepolymer of the formula:

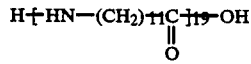

YOUNG E modulus=20 GPa

Breaking force=400 MPa

EXAMPLE 3

One operates under the conditions of Example 1, but with a prepolymer of the formula:

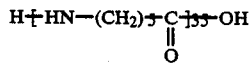

the temperature of the first die being 300° C. instead of 270° C.

YOUNG E modulus=23 GPa

Breaking force=593 MPa

EXAMPLE 4

One operates under the conditions of Example 1 with a prepolymer of Example 3, but replacing the glass fibers with KEVLAR fibers.

The following results are obtained from the test specimens containing 30% by weight of KEVLAR:

YOUNG E modulus=24 GPa

Breaking force =358 MPa

EXAMPLE 5

One operates under the conditions of Example 4, but with a prepolymer of the formula:

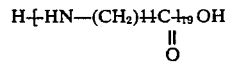

YOUNG E modulus=23 GPa

Breaking force=308 MPa

While the invention has been described in connection with a preferred embodiment, it is not intended to limit the scope of the invention to the particular form set forth, but, on the contrary, it is intended to cover such alter natives, modifications, and equivalents as may be included within the spirit and scope of the invention as defined by the appended claims.

What is claimed is:

1. A process for the manufacture of a polyamide composite material reinforced with long fibers, the improvement comprising impregnating the fibers with a polyamide oligomer or prepolymer, heat-treating the impregnated fiber to polymerize said oligomer or prepolymer, and then shaping the impregnated fiber by pultrusion.

2. The process of claim 1, wherein each end of the molecular chain of the said oligomer or prepolymer has a reactive functional group which can react from one molecule to another molecule of the oligomer or prepolymer.

3. The process of claim 2, wherein the ends of the molecular chain of the said oligomer or prepolymer have an amine functional group and a carboxylic acid functional group.

4. The process of claim 3, wherein the oligomer or prepolymer has the formula:

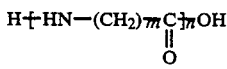

in which:

m is a number from 5 to 11 and n is a number from 10 to 40.

5. The process of claim 1, 2, or 3, wherein before undergoing pultrusion, the impregnated fibers are heated at a temperature of from 190° C. to 350° C.

6. The process of claim 4, wherein before undergoing pultrusion, the impregnated fibers are heated so that the said oligomer or prepolymer is transformed into a polymer where the value of n ranges from about 50 to 80.

7. The process of claim 1, 2, 3, or 4, wherein after undergoing the heat treatment, the polymer impregnated fibers are subjected to pultrusion in a shaping die at a temperature of from about 190° C. to 300° C.

8. The process of claim 1, 2, 3, or 4, wherein pultrusion is carried out at a rate of from about 0.3 to 3 meters per minute.

9. The process of claim 1, wherein the oligomer or prepolymer has the formula:

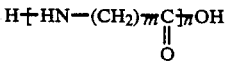

in which:

m is a number from 5 to 11 and n is a number from 10 to 40, the impregnated fibers prior to pultrusion are heated to a temperature of from about 190° C. to 350° C., the heated fibers are then subjected to pultrusion in a shaping die at a temperature of from about 190° C. to 350° C., and the pultrusion rate is from about 0.3 to 3 meters per minute.

* * * * *